Aug. 10, 1965  W. ENGEL  3,200,316
ELECTRONICALLY COMMUTATED DIRECT-CURRENT MOTOR
Filed May 9, 1963  2 Sheets-Sheet 1
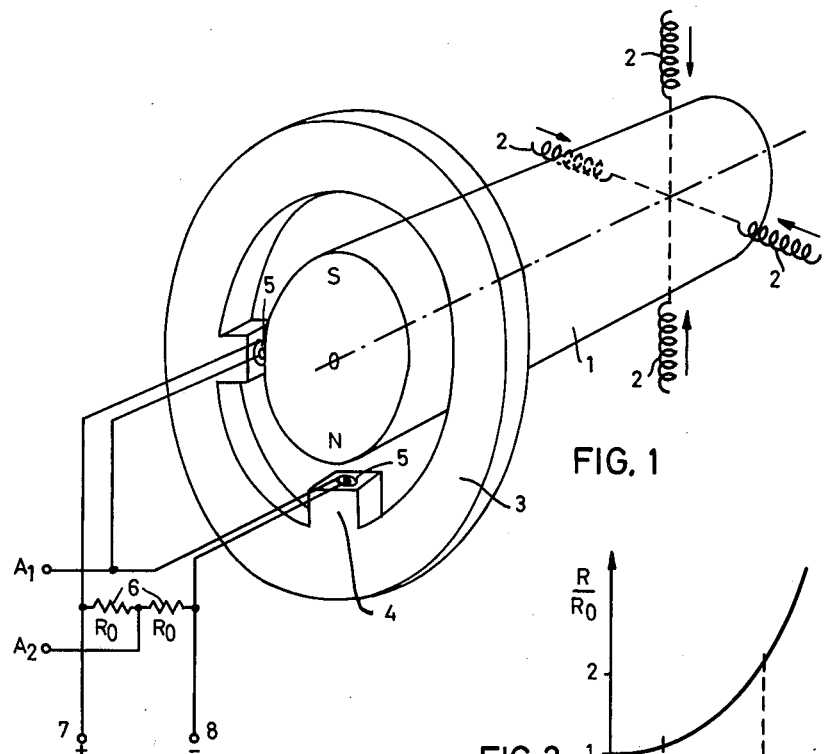
FIG. 1
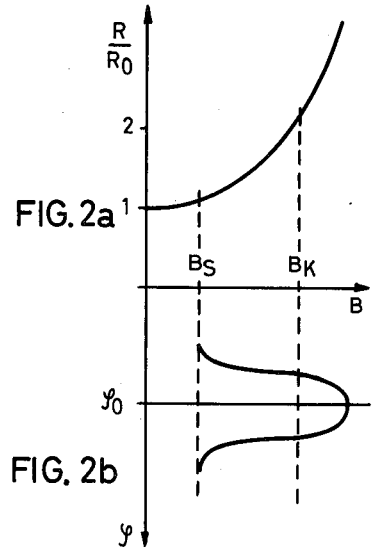
FIG. 2a
FIG. 2b
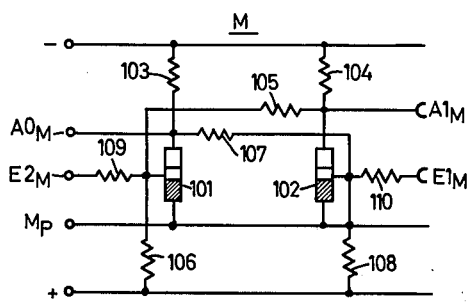
FIG. 4

United States Patent Office 3,200,316
Patented Aug. 10, 1965

3,200,316
ELECTRONICALLY COMMUTATED DIRECT-
CURRENT MOTOR
Walter Engel, Nurnberg, Germany, assignor to Siemens-
Schuckertwerke Aktiengesellschaft, Berlin-Siemens-
stadt, Germany, a corporation of Germany
Filed May 9, 1963, Ser. No. 279,079
Claims priority, application Germany, May 11, 1962,
S 79,401
7 Claims. (Cl. 318—138)

My invention relates to an electronically commutated direct-current motor, particularly of the high-speed subminiature type having a permanently magnetized rotor and suitable for mounting in the handle of a dentist's drill operating in the speed range of 50,000 to 200,000 revolutions per minute, and for other such specialized applications.

Such motors require adjustable speeds with reversible operating directions, moments independent of speed, and fast braking characteristics.

The usual copper-carbon commutator systems are unsuitable for such high speed motors. To replace them there exist commutation devices which utilize Hall voltage generators in the range of a permanent magnet rotor so that the Hall voltage can regulate an electronic commutator apparatus.

However, Hall voltage generators require four leads which may not always easily be accommodated in small motors. Moreover, a Hall voltage generator produces an output proportional to the magnetic induction, and, whereas this property is normally desirable, it is a disadvantage in subminiature motors because of the relatively high stray fluxes which exist when a transversely magnetized cylindrical rotor is also used for commutation. Thus the flux change between the rest and energized condition of a Hall voltage generator, and therefore its Hall voltage output, is comparatively small. As a result, the commutation points in such devices are indistinct.

Thus, it is an object of my invention to overcome these difficulties while nevertheless maintaining the desired operating characteristics of a subminiature high-speed D.-C. motor.

More particularly, it is an object of my invention to provide an electronically-commutated reversible subminiature D.-C. motor adjustably operable throughout the speed range of 50,000 to 200,000 revolutions per minute and having fast-braking characteristics.

To this end and in accordance with a feature of my invention, I locate two magnetic-field responsive resistors in the range of the rotor displacing them 90° from each other, and connecting them with two magnetically insensitive resistors into a bridge which I energize with a direct-current source, and I use the alternating output voltage of the bridge to control an electronic commutating device. Contrary to a Hall voltage generator, a magnetic flux-responsive resistance is not proportional to the energizing flux, a matter which is usually considered a severe shortcoming, but exhibits a non-linear characteristic which remains small and close to its quiescent resistance in the presence of small magnetic fluxes, but which rises steeply in the presence of strong magnetic fluxes. According to another feature of my invention I arrange the flux-responsive resistors in such a manner that the magnetic field of the rotor poles will cause operation in the steeply ascending section of their resistance flux characteristics.

As a further feature of my invention, I place the flux-responsive resistors upon salient pole shoes, preferably using for these resistances so-called field discs or Corbino discs, which constitute round discs having electrodes at their respective centers and peripheries. Preferably I use a radially magnetized cylinder for the rotor, although it will be understood that direct-current energized electromagnet rotors are also usable. However, a permanently magnetized rotor is particularly suitable for very high speeds.

According to still another feature of the invention, I provide for means to reverse the D.-C. energization of the before-mentioned bridge so as to reverse the motor direction. As a result, the electronic commutator apparatus for the stator windings of the motors are then energized in opposite sequence. Preferably, the stator is provided with four windings displaced 90° with respect to each other.

Other objects and advantages of the invention will become obvious from the following detailed description of an apparatus embodying features of the invention when read in light of the accompanying drawings, wherein:

FIG. 1 is a partially perspective and partially schematic drawing of the essential components of a motor embodying features of this invention.

FIGS. 2a and 2b are respective graphs showing the resistance-flux characteristics of the flux-responsive resistors according to the invention and the flux-rotor position characteristics of the salient pole shoes according to the invention.

FIG. 4 is a schematic circuit diagram of the flip-flops used in FIG. 3.

Figure 3:
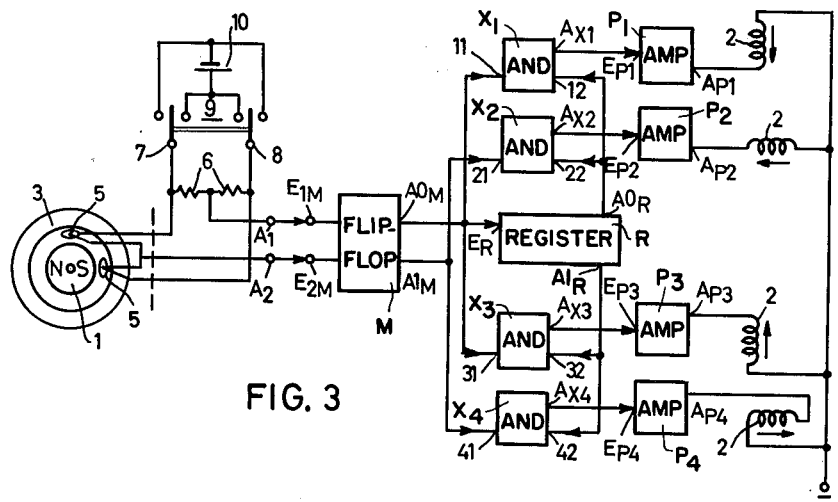
FIG. 3 is a partially block and partially schematic diagram showing the motor, its controls and the commutating apparatus therefor according to the invention.

In FIG. 1 a permanent magnetic rotor 1 possesses four stator windings 2. The structural design of the stator and the location of the windings may be of any desired kind to conform with given space conditions. A ferromagnetic ring 3 in the range of the rotor comprises integral salient pole shoes 4 spaced 90° from each other. Field discs 5 are secured on the pole shoes 4 for the magnetic field from one rotor pole to pass through one field disc and complete a magnetic circuit to the other pole through the ring 3. For the sake of clarity the width of the air gap between the poles 4 and the rotor 1 is shown on an exaggerated scale.

The two field discs are connected in series with each other. Two normal series-connected resistors 6 are then arranged in parallel thereto to form a bridge, the value of said resistors corresponding to the unmagnetized basic resistance $R_0$ of the field discs 5. The bridge is supplied across the two parallel connected resistance pairs with a direct current from terminals 7 and 8. An output voltage is taken at terminals $A_1$ and $A_2$ forming the junctions between the respective series-connected resistors. While the rotor 1 is rotating, an alternating voltage is generated in the amplitude of which is approximately ⅙ of the direct supply voltage of the bridge.

An example of the change in resistance effected by changes in flux through the resistance discs 5 is illustrated in FIG. 2a. The value $R_0$ represents the quiescent resistance value of the disc 5 (when it is not subjected to a magnetic field). The value $R/R_0$ represents the ratio of its resistance to its quiescent resistance value. For flux values below $B_s$ the resistance value of discs 5 rises hardly at all from the quiescent value. However the resistance increases sharply at values over $B_s$.

FIG. 2b illustrates the change in flux B at the discs 5 for changes in the position of magnetic poles on rotor 1. When one of the rotor poles directly faces a field disc its position is defined by $\phi_0$. The flux curve illustrated in FIG. 2b is obtained at the disc upon rotation of the rotor at angles $\phi$ in either direction. The stray flux exhibits a constant low value $B_s$ effecting only negligible changes in the resistance of the field discs (see FIG. 2a). FIGS. 2a and 2b, show that the moment of commutation (at the induction $B_k$) may be determined with relative precision in view of the non-linear characteristic curve of the magnetic-field-responsive resistance.

FIG. 3 shows a block circuit diagram of the motor with its electronic commutating apparatus. The reference numerals of FIG. 1 have been partly retained. The supply voltage for the bridge unit is constituted by a direct-current source 10 whose polarity is adapted to be reversed by a switch 9 to reverse the direction of motor rotation. The output voltage of the bridge unit energizes the input terminals $E_{1M}$ and $E_{2M}$ of a bistable flip-flop stage M whose main output $A_{0M}$ connects to the input $E_R$ of a register R as well as to the inputs 11 and 31 of AND-gates $X_1$, $X_3$. The complementary output $A_{1M}$ of the flip-flop stage M is connected to the inputs 21 and 41 of AND-gates $X_2$, $X_4$.

Output $A_{0R}$ and complementary output $A_{1R}$ of the register R supply the other inputs 12, 22 and 32, 42 of the AND-gates $X_1$, $X_2$ and $X_3$, $X_4$ respectively. The outputs $A_{X1}$, $A_{X2}$, $A_{X3}$ and $A_{X4}$ of the respective AND-gates connect for amplification to the inputs $E_{P1}$, $E_{P2}$, $E_{P3}$, and $E_{P4}$ of power amplifiers $P_1$, $P_2$, $P_3$ and $P_4$. The stator windings 2 are energized at the outputs $A_1$, $A_2$, $A_3$ and $A_4$ of the amplifiers. Thus, the following conductance diagram for the respective circuit conditions of the commutating device is obtained for one direction of rotation:

| Angle of rotation | M | | R | | P | | | |
|---|---|---|---|---|---|---|---|---|
| | $A_0$ | $A_1$ | $A_0$ | $A_1$ | 1 | 2 | 3 | 4 |
| 90° | C | O | C | O | C | O | O | O |
| 180° | O | C | C | O | O | C | O | O |
| 270° | C | O | O | C | O | O | C | O |
| 360° | O | C | O | C | O | O | O | C |

When the polarity of the direct-voltage source 10 is reversed, the stator windings 2 are energized in the opposite sequence.

When the motor is switched on to rotate in a predetermined direction the rotor may initially turn in the wrong direction until the output voltage of the bridge unit becomes effective to control the commutating device so as to operate in the desired direction of rotation. However this short reverse is hardly noticeable, and essentially insignificant.

Figure 5:
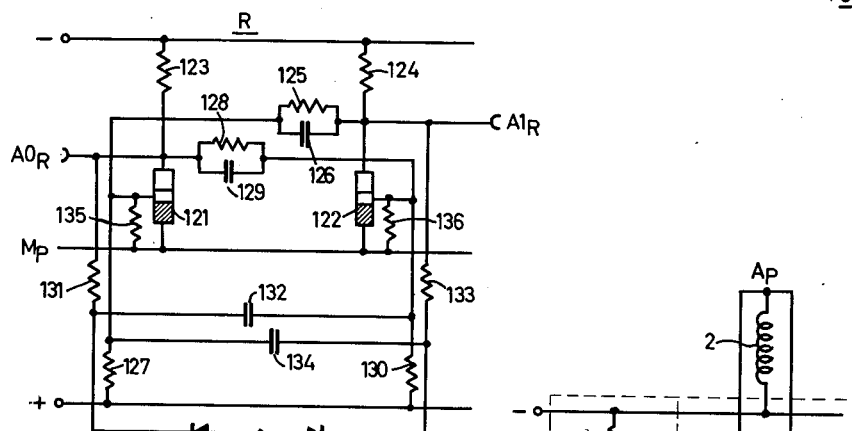
FIG. 5 is a schematic diagram of a register used in FIG. 3.
Figure 6:
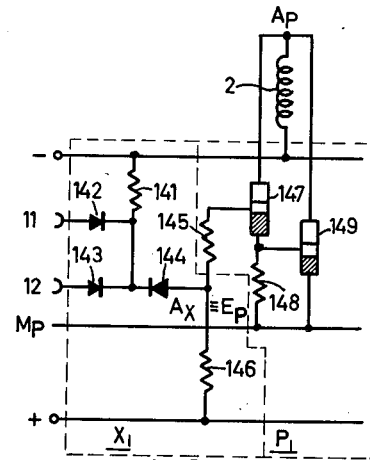
FIG. 6 is a schematic diagram of the gate circuits used in FIG. 3.

FIGS. 4, 5 and 6 illustrate examples of circuit connection for the individual stages of the commutating device illustrated in FIG. 3.

The bistable flip-flop stage M of FIG. 3 preferably comprises the circuitry of FIG. 4, which includes two transistors 101, 102 with collector resistors 103 and 104. The base electrodes of the transistors 101 and 102 are connected to the center of voltage dividers consisting of resistors 105, 106 and 107, 108 and are supplied with input signals through input resistors 109 and 110. The output voltage of the flip-flop stage is available across the collector electrodes of the transistors. The resistors 105 and 107 serve for feedback from the bases to the opposite collectors which are energized through resistors 104 and 103. The outputs $A_{0M}$ and $A_{1M}$ appear at the respective collectors. In accordance with FIG. 5 the register R includes two transistors 121 and 122 with collector resistors 123 and 124. The base electrodes of the transistors are connected to voltage dividers consisting of RC circuits 125, 126 and 128, 129, and of a resistor 127 and 130, respectively. The input signals are supplied via diodes 137, 138 and resistors 131, 133 to the collector electrodes of the transistors, while the connection between the diodes and the base electrodes is established through capacitors 132 and 134. Resistors 135, 136 connect parallel to the base-emitter path of the transistors. The AND-gate $X_1$ and power amplifier means $P_1$ are illustrated in FIG. 6, the commutating device comprising four such circuit units. The AND-gate includes input diodes 142 and 143, as well as a resistor 141, a diode 144 and a resistor 146. The output signal of the AND-gate is supplied by a resistance 145, to a two-stage transistor amplifier unit composed of the transistors 147 and 149. The first transistor of said transistor amplifier unit is provided with an emitter resistance 148. The stator winding 2 is located in the mutual collector circuit.

It is to be understood that the commutating device may also be embodied in a different manner. More particularly, I contemplate substituting semiconductor controlled rectifiers for the transistors in the power amplifiers, taking due care for the provision of appropriate turn-off circuits of the conventional type.

Where the handpiece of a dentist's drill is to accommodate the motor, it is preferable to locate the non-magnetic-field-responsive resistances 6 of the bridge unit, as well as the commutating device within a separate control device. As seen in FIG. 3 at the dotted line at T, only three electrical lines are then required for establishing the connection with the magnetic-field-responsive resistances 5.

While an embodiment of the invention has been described in detail it will be obvious to those skilled in the art that the invention may be otherwise embodied.

I claim:

1. An electronically commutated D.-C. motor system comprising magnetized rotor means, stator means including a plurality of windings angularly displaced around said rotor for inductively interlinking with said rotor, two magnetic-field responsive resistance means each having resistance increasing slowly for flux increases at lower flux values and increasing steeply for flux increases at more intense flux values, said magnetic-field responsive resistance means being displaced from each other around the rotor and subjected to varying flux as the rotor turns in such a manner that when the rotor flux is greatest the resistance of said resistance means will vary steeply with changes of flux and so that when the rotor flux is minimum the resistance will vary slowly for changes in flux, two magnetically-independent resistance means connecting to said magnetic-field responsive resistance means for forming a bridge, direct voltage means for energizing said bridge, output means on said bridge having an alternating output in response to rotation of said rotor, and control means connecting said output means to said windings for commutating them.

2. An electronically commutated D.-C. motor system comprising magnetized rotor means, stator means including a plurality of windings angularly displaced around said rotor for inductively interlinking with said rotor, two magnetic-field responsive resistance means each having resistances increasing slowly for flux increases at lower flux values and increasing steeply for flux increases at more intense flux values, said magnetic-field responsive resistance means being displaced from each other 90° around the rotor and subjected to varying flux as the rotor turns in such a manner that when the rotor flux is greatest the resistance of said resistance means will vary steeply with changes of flux and so that when the rotor flux is minimum the resistance will vary slowly for changes in flux, a pair of salient pole shoes for supporting said magnetic-field responsive resistance means, two magnetically-independent resistance means connecting to said magnetic field responsive resistance means for forming a bridge, direct voltage means for energizing said bridge, output means on said bridge having an alternating output in response to rotation of said rotor, and control means connecting said output means to said windings for commutating them.

3. An electronically commutated D.-C. motor system comprising magnetized rotor means including a cylinder permanently magnetized in a radial direction, stator means including a plurality of windings angularly displaced around said rotor for inductively interlinking with said rotor, two magnetic-field responsive resistance means each having resistances increasing slowly for flux increases at lower flux values and increasing steeply for flux increases at more intense flux values, said magnetic-field responsive resistance means being displaced from each other 90° around the rotor and subjected to varying flux as the rotor turns in such a manner that when the rotor flux is greatest the resistance of said resistance means will vary steeply with changes of flux and so that when the rotor flux is minimum the resistance will vary slowly for changes in flux, a pair of salient pole shoes for supporting said magnetic-field responsive resistance means, two magnetically-independent resistance means connecting to said magnetic-field responsive resistance means for forming a bridge, direct voltage means for energizing said bridge, output means on said bridge having an alternating output in response to rotation of said rotor, and control means connecting said output means to said windings for commutating them.

4. An electronically commutated D.-C. motor system comprising magnetized rotor means, stator means including a plurality of windings angularly displaced around said rotor for inductively interlinking with said rotor, two magnetic-field responsive resistance means each having resistances increasing slowly for flux increases at lower flux values and increasing steeply for flux increases at more intense flux values, said magnetic-field responsive resistance means being displaced from each other 90° around the rotor and subjected to varying flux as the rotor turns in such a manner that when the rotor flux is greatest the resistance of said resistance means will vary steeply with changes of flux and so that when the rotor flux is minimum the resistance will vary slowly for changes in flux, two magnetically-independent resistance means connecting to said magnetic-field responsive resistance means for forming a bridge, direct voltage means for energizing said bridge, output means on said bridge having an alternating output in response to rotation of said rotor, and control means connecting said output means to said windings for commutating them, and switching means for reversing the polarity of the direct voltage means so as to reverse the motor direction.

5. An electronically commutated D.-C. motor system comprising magnetized rotor means, stator means including a plurality of windings angularly displaced around said rotor for inductively interlinking with said rotor, two magnetic-field responsive resistance means each having resistances increasing slowly for flux increases at lower flux values and increasing steeply for flux increases at more intense flux values, said magnetic-field responsive resistance means being displaced from each other 90° around the rotor and subjected to varying flux as the rotor turns in such a manner that when the rotor flux is greatest the resistance of said resistance means will vary steeply with changes of flux and so that when the rotor flux is minimum the resistance will vary slowly for changes in flux, two magnetically-independent resistance means connecting to said magnetic-field responsive resistance means for forming a bridge, direct voltage means for energizing said bridge, output means on said bridge having an alternating output in response to rotation of said rotor, and control means connecting said output means to said windings for commutating them, and switching means for reversing the polarity of the direct voltage means, said control means including a bistable flip-flop stage, a register connected to the flip-flop stage, a plurality of AND-gates connected to said register and power amplifiers connecting each AND-gate with a winding.

6. An electronically commutated D.-C. motor system comprising magnetized rotor means, stator means including a plurality of windings angularly displaced around said rotor for inductively interlinking with said rotor, two magnetic-field responsive resistance means each having resistances increasing slowly for flux increases at lower flux values and increasing steeply for flux increased at more intense flux values, said magnetic-field responsive resistance means being displaced from each other 90° around the rotor and subjected to varying flux as the rotor turns in such a manner that when the rotor flux is greatest the resistance of said resistance means will vary steeply with changes of flux and so that when the rotor flux is minimum the resistance will vary slowly for changes in flux, two magnetically-independent resistance means connecting to said magnetic-field responsive resistance means for forming a bridge, direct voltage means for energizing said bridge, output means on said bridge having an alternating output in response to rotation of said rotor, and control means connecting said output means to said windings for commuating them, and switching means for reversing the polarity of the direct voltage means, said control means including a bistable flip-flop stage, a register connected to the flip-flop stage, a plurality of AND-gates connected to said register and power amplifiers connecting each AND-gate with a winding, said rotor and stator means and magnetic-field responsive resistances forming a motor, a housing for said motor, said housing constituting a handpiece for a dentist's drill, and a separate housing for said bridge and control means.

7. An electronically commutated D.-C. motor comprising magnetized rotor means, stator means including a plurality of windings angularly displaced around said rotor for inductively interlinking with said rotor, two magnetic-field responsive resistance means each having resistances increasing slowly for flux increases at lower flux values and increasing steeply for flux increases at more intense flux values, said magnetic-field responsive resistance means being displaced from each other 90° around the rotor and subjected to varying flux as the rotor turns in such a manner that when the rotor flux is greatest the resistance of said resistance means will vary steeply with changes of flux and so that when the rotor flux is minimum the resistance will vary slowly for changes in flux.

No references cited.

ORIS L. RADER, *Primary Examiner.*